March 11, 1947.  R. C. SWITZER  2,417,384
DAYLIGHT FLUORESCENT SIGNALING AND DISPLAY DEVICE
Filed July 16, 1943
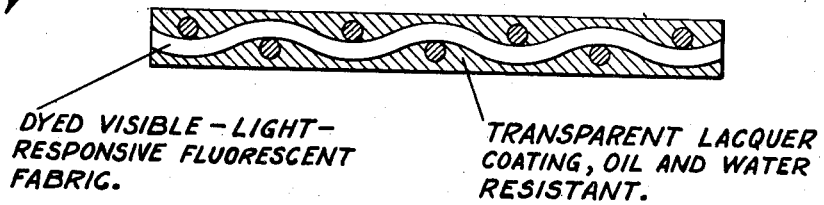
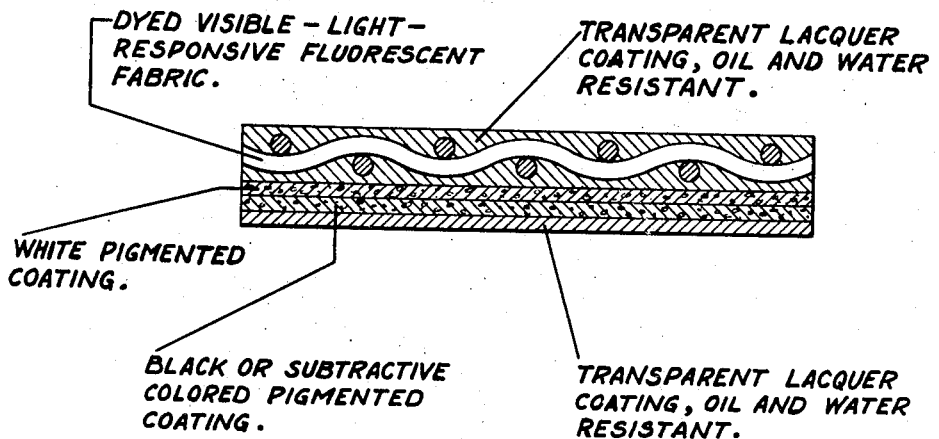
INVENTOR.
ROBERT C. SWITZER
BY
Ely & Frye
ATTORNEYS Patented Mar. 11, 1947

2,417,384

UNITED STATES PATENT OFFICE 2,417,384

DAYLIGHT FLUORESCENT SIGNALING AND DISPLAY DEVICE

Robert C. Switzer, South Euclid, Ohio

Application July 16, 1943, Serial No. 494,969

5 Claims. (Cl. 250—71)

This invention relates to an improvement in daylight fluorescent signaling and display devices and, more particularly, to signal panels, flags, markers, and like devices fabricated from sheets and webs, said devices utilizing the phenomenon of fluorescence in response to visible light as well as ultraviolet. This invention also relates to a method of daytime signaling and displaying. (It is to be understood in this specification and in the claims that the term "visual signaling and display devices" excludes artificial light sources, per se, and mirrors.) This invention is a continuation-in-part of the application of Joseph L. Switzer, Robert C. Switzer, and Richard A. Ward for Light-responsive fluorescent media, filed August 21, 1942, Serial No. 455,610, and of Robert C. Switzer for Fluorescent media, filed February 9, 1939, Serial No. 255,399.

In spite of their limitations, visual daytime signaling devices, such as panels, flags, semaphores, and the like, are still being widely used. One of the most familiar military uses of such devices is the use of flags, pennants and semaphores for identification of vessels and communication between vessels. Another important but somewhat less familiar military use of such signal devices is for identification and communication between air and ground forces, for location of supplies and stations in amphibious attacks, and the like. The many and varied uses of signs, markers, flags, and the like for civilian purposes are, of course, well known.

The simplicity of prior art visual daytime signaling devices within the field in which they are used overbalances their serious and accepted limitations, the principal limitation being the loss of color-perceptibility at appreciable distances of several miles, even during ideal conditions of bright sunlight and clear atmosphere. When sunlight is impaired, as on cloudy days, or at dawn or twilight, or when the atmosphere is foggy or hazy, the useful range of prior art visual daytime signaling devices is even more limited. Another accepted inherent fault of prior art visual daytime signaling devices is that such devices are very often colored and that as the limit of their useful range is approached, normal subtractive colors tend to appear as black or white or simply disappear. Still another limitation of prior art visual daytime signaling devices, which are usually made of dyed bunting or like fabric, is that they become soiled during use and must be laundered to restore their utility.

It is the object of this invention to provide visual daytime signaling devices which greatly extend the useful range of said devices, and particularly, the distance at which the colors of such devices are optically perceptible and distinguishable. It is a particular and peculiar advantage of this invention that my visual daytime signaling devices are also distinguishable by infra-red detecting devices at much greater distances than prior art reflective signaling devices are distinguishable.

It is another object of my invention to provide visual daytime signaling devices which are less impaired by adverse lighting and atmospheric conditions than the prior art devices. It is also an object of this invention to provide visual daytime signaling devices which may be readily cleaned of most soil by merely wiping with water or gasoline and may thus be easily maintained at maximum efficiency under adverse conditions.

Other objects and advantages of this invention will be apparent from the following specification, claims, and drawings in which:

Fig. 1 is an enlarged diagrammatic section of a coated signal panel made according to this invention.

Figure 2 is a modification of the panel as illustrated in Fig. 1.

In order to describe my invention generally, it is necessary to explain briefly that heretofore colored signal panels, flags, pennants, markers and the like were usually made of dyed bunting or like cotton fabrics dyed with direct or vat cotton dyes carefully selected for fastness to light. To aid the distinctiveness of the signal devices, the dyed colors were strong, bold colors, such as intense primary reds, yellows, and blues, selected so that the colors would contrast strongly with each other and with white. Such prior art dyed fabrics exhibited their color due to the well-recognized phenomenon of "selective absorption and reflection," that is, the colors were "subtractive" colors because the colors "subtracted," i. e., absorbed, certain of the wavebands of incident white light and reflected other wave-bands. None of the subtractive colors are perfect selective reflectors or absorbers, but the more a colored fabric, say blue, for example, reflects the blue in the incident light and predominantly absorbed the other wave-bands of the incident light, the "purer" the blue becomes, and, within the phenomenon of absorption and reflection, the more desirable that dyed fabric becomes for color distinguishability in the prior art visual daytime signaling devices. As the subtractive colors are rendered purer, however, the colors, due to the very phenomenon of selective absorption and reflection involved, tend to lose brightness (purity being the relative predominance of one wave-band over all other wave-bands reflected and brightness being a function of the total amount of light reflected). Since the distance at which a given subtractive color can be perceived is dependent upon the total amount of light of that color which is reflected, as purity of a subtractive color increases, the distances at which the color can be perceived decreases.

Within the phenomenon of absorption and reflection, the only manner of increasing brightness of a color is to whiten the color (since white is the optimum light reflector), but in whitening a color, purity, i. e., color-distinguishability, is decreased. Therefore, in the prior art devices, optimum colors were obtained by compromising brightness (perceptibility at a distance) and purity (color distinguishability). Since color as such is useless in daytime signaling devices unless the color is distinguishable from white, black, and other colors, in the empirically determined optimum subtractive colored devices of the prior art brightness was sacrificed for purity.

It is well-known that certain dyes exhibit the phenomenon of ultra-violet fluorescence when in solution, that is, the dissolved dyes will emit visible light when activated by invisible fluorescigenous radiation, commonly ultra-violet. Now I have observed that, when certain ultra-violet fluorescent dyes were in dilute solution, the solutions were extremely and peculiarly bright in daylight and that, as the tinctorial strength of each solution was increased by concentrating the solution, the peculiar daytime brightness diminished. It was also noted that the usual methods of affixing such fluorescent dyes to fabrics, as by mordanting, destroyed the peculiar daytime brightness. However, it has been discovered that, by carefully following certain dye techniques and by carefully selecting the fabrics to be dyed so that the fluorescent dye is oriented on or in the fabrics in a state of or akin to solution, the dyed fabrics will exhibit the aforesaid peculiar brightness in daylight. Such daytime brightness can also be maintained by dissolving the dye in suitable resins.

I have discovered several unexpected phenomena exhibited by my signal devices which maintain the aforesaid peculiar daytime brightness of dilute solutions of certain fluorescent dyes. First, even though the colors of my fluorescent signal devices are not especially tinctorially strong, as compared to strong subtractive colors, the colors of my devices are perceptible and distinguishable at distances greatly in excess of the distances at which the colors of subtractive colored signal devices are perceptible and distinguishable from black, white, and other colors. Second, the useful range of my fluorescent signal devices is proportionally increased and more pronounced under adverse lighting and atmospheric conditions. For example, on a clear day under a noonday sun, a red fluorescent signal panel made according to my invention may be perceptible and distinguishable as a red panel at distances of 150% of the distance at which the best prior art subtractive colored red panel of equal area is barely perceptible as a red panel; on an overcast day in which there is appreciable atmospheric haze, my red fluorescent signal panel may be perceived as a red panel at a distance of as much as 300% of the distance at which a prior art red panel would lose perceptibility and distinguishability under like conditions. A third phenomenon is that red-reflecting fluorescent signal devices made according to my invention are usually not merely excellent reflectors of shorter infra-red but the total amount of shorter infra-red reflected and emitted by such signal devices may exceed 100% of such infra-red in the incident sunlight. Thus, by scanning a landscape or seascape with an infra-red detecting device, such signal devices made according to my invention are detected more readily than any other known reflector of such shorter infra-red.

In searching for an explanation of the above phenomena, I noted that my signal devices not only fluoresce in response to ultra-violet but also, in response to visible light of shorter wavelengths, fluoresce in wave-bands of visible light at approximately the predominant reflected color wave-band of the device. Thus, my red fluorescent signal devices exhibit color, not only by reflecting the red in the incident sunlight, but also by transforming incident invisible ultra-violet and visible violet, blue, green, yellow, and orange light (which would ordinarily be absorbed and dissipated) to emit visible red and invisible infra-red. Accordingly, my signal devices are described as visible-light-responsive fluorescent devices. Therefore, instead of being forced to sacrifice brightness for purity of color to obtain color distinguishability by increasing the amount of incident light absorbed and dissipated, as in the subtractive color devices of the prior art, in my visible-light-responsive devices, I utilize heretofore dissipated energy. I obtain extreme color brightness from such converted energy and a color purity adequate for color distinguishability at a distance far beyond the perceptibility range of a similar subtractive color. In fact, in my devices I may obtain distinguishable color brightness greater than white, a mathematical impossibility with the subtractive colored devices of the prior art.

Keeping in mind the foregoing explanation of the phenomena involved, my invention may be generally described as relating to devices which maintain fluorescent dyes in a visible-light-responsive state upon a suitable supporting surface and the utilization of such devices for the visual conveyance of intelligence in daylight within and beyond the range of subtractive color perceptibility. Illustrative but not limitative examples of visible-light-responsive fluorescent devices made according to my invention are as follows:

*Example 1*

6 oz. white cellulose acetate satin is dyed by immersion for two minutes in an aqueous dye bath maintained at 180° F. and consisting of

|  | Per cent |
|---|---|
| Formic acid | 15.0 |
| Meta diethylaminophenol phthalein hydrochloride | 0.17 |

The dyed satin is given a cold rinse, neutralized in a cold soda ash solution, rinsed again, and then dried. Fastness to light and weathering is somewhat improved by an after-treatment consisting of passing the dried dyed satin through an aqueous solution of

|  | Per cent |
|---|---|
| Formic acid | 40.0 |
| Zinc chloride | 1.0 |

The after-treated fabric is squeezed, tentered, and dried. Expanders should not be used in the formic acid bath and not until after the fabric has been neutralized. Cellulose acetate satin dyed by the foregoing procedure is a very bright cerise which exhibits visible-light-responsive fluorescence to a pronounced degree.

*Example 2*

6 oz. white cellulose acetate satin is immersed for two minutes in an aqueous dye bath maintained at 180° F. and consisting of

| | Per cent |
|---|---|
| Formic acid | 15.0 |
| Meta diethylaminophenol phthalein hydrochloride | 0.17 |

The fabric is then rinsed, neutralized, and shaded by immersion for 15 minutes in an aqueous dye bath maintained at 180° F. and consisting of

| | Per cent |
|---|---|
| Fluorescent Yellow HEB | 1.00 |
| Fatty alcohol sulphate | 1.00 |
| Sodium chloride | 1.00 |

The dyed fabric is then rinsed and tentered in the usual manner. The fabric is dyed a strong red, more orange than the cerise of Example 1.

Example 3

6 oz. white cellulose acetate satin is dyed by immersion for two minutes in the shading bath of Example 2. The dyed fabric is rinsed hot and then shaded by immersion for five minutes in an aqueous shading bath maintained at 180° F. and consisting of

| | Per cent |
|---|---|
| Formic acid | 15.0 |
| Meta diethylaminophenol phthalein ethylester hydrochloride | 0.05 |
| Meta diethylaminophenol phthalein hydrochloride | 0.02 |

The dyed fabric is then rinsed cold, neutralized, rinsed again, tentered, and dried. The fabric is dyed a bright visible-light-responsive fluorescent orange.

Example 4

6 oz. white cellulose acetate satin is dyed by immersion for five minutes in the shading bath of Example 2, except that the dye concentration is reduced to 0.75%. The fabric is dyed a bright visible-light-responsive fluorescent yellow.

Example 5

6 oz. white cellulose acetate satin is dyed by immersion for two minutes in the shading bath of Example 2. The dyed fabric is rinsed hot and then shaded by immersion for one minute in an aqueous dye bath maintained at 180° F. and consisting of

| | Per cent |
|---|---|
| Formic acid | 15.0 |
| Di(dimethylaminophenyl) phenyl amino naphthyl methene chloride [a tri-phenyl methane dyestuff] | 0.0025 |

The dyed fabric is then rinsed cold, tentered, and dried. The fabric is dyed a bright visible-light-responsive fluorescent green.

Example 6

4 oz. white silk crepe is dyed by immersion for two minutes in an aqueous dye bath maintained at 150° F. and consisting of

| | Per cent |
|---|---|
| 4 methyl, 7 hydroxy coumarin sodium salt | 0.5 |

The dyed fabric is rinsed hot, then rinsed cold, and finally tentered and dried. The silk exhibits a blue fluorescence.

The above fabrics will exhibit visible-light-responsive fluorescence and may be used without further treatment, other than cutting and sewing, for visual daytime signaling devices. I have found that the visible-light-responsive fluorescence is generally improved when the fabric is a satin or possesses a similar glossy surface. The weathering properties of the fabrics are somewhat enhanced by impregnating and coating the fabrics with a clear lacquer, as shown in Figure 1 of the drawings. If the fabrics are coated with oil-resistant and water-resistant coatings, such as vinyl resin or cellulosic lacquers, the serviceability of the signal devices is greatly improved. In the event such coated signal devices become soiled, they may be simply and quickly wiped clean with water and or gasoline, both of which are usually available in modern warfare, neither the time nor facilities may be available for laundering the prior art devices.

In many instances it may be desirable to employ a "two-sided" signal device. In such cases, visible-light-responsive fluorescent fabric is coated on one side with either white alone or white covered black or by a colored pigmented coating, as shown in Figure 2 of the drawings.

The visible-light-responsive fluorescent fabrics may be fabricated into flags, pennants, and like signal devices in the usual manner. To make a fluorescent signal panel for use between air and ground forces, for example, a length of coated fabric as disclosed in Figure 2 of the drawings is cut and then bound with suitable reinforcing tape. Tie-cords are then secured to the tape to complete the panel. The panel may be tied to vehicles for identification purposes or staked on the ground to communicate with a cooperating air force.

The foregoing examples are given to illustrate visible-light-responsive fluorescent fabrics used for flags, pennants, panels and like signaling devices. This invention, however, is not limited to signaling devices, per se, but is useful in other fields, as, for example, in unlighted outdoor advertising displays for daytime showing, where the visibility is increased and appearance improved by the intense fluorescence of display during exposure to radiations from the sun. As an example of the use of visible-light-responsive devices for display purposes, the following example was given in my above cited application for Fluorescent media:

Example 7

White paper, such as 140 pound basis photogelatine printing stock, may be coated advantageously by means of air-spray equipment with a fluorescent coating composition composed of one part of the organic substance of the general formula

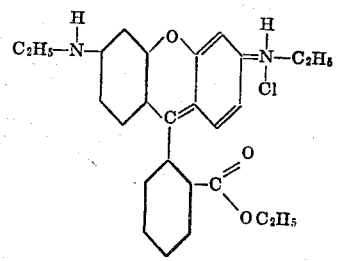

dissolved in 170 parts by weight of a 60% butyl alcohol solution or urea formaldehyde resin. A plurality of thin, uniform applications are made with a short drying time allowed between coats. The evenly coated paper is air-dried for at least 20 minutes and is finally baked for 2 hours at 200° F. or for other periods of time at such temperatures as will properly condition the resinous content of the coating. The fiery orange fluorescence of the sheeting in sunlight render it highly desirable as a daylight color.

Example 8

A coating composition is prepared by dissolving a red visible-light-responsive N-alkylated meta aminophenol phthalein dye in a suitable resin carrier as follows:

| | Per cent |
|---|---|
| Butyl alcohol solution of butyl alcohol modified urea formaldehyde resin (60% resin, by weight) | [1] 99.35 |
| Meta monobutylaminophenol phthalein | 0.65 |

[1] By weight of resin solution.

The foregoing coating composition is coated on light-weight bonderized sheet steel coated with a titanium oxide pigmented alkyd lacquer. The coated metal is then baked for one hour at 250° F. to polymerize the visible-light-responsive fluorescent coating.

Using any of the fluorescent sheetings disclosed in the foregoing examples, but usually one as disclosed in Examples 7 and 8, visible-light-responsive fluorescent ornamentation of outdoor surfaces for display purposes may now be accomplished either (1) by cutting characters and figures from the fluorescent sheeting and affixing them to an outdoor supporting member or (2) by affixing a solid fluorescent sheet to an outdoor supporting member and applying heavy coats of ordinary non-fluorescent paints over the sheeting to opaque out those areas required to be non-fluorescent. The darker fluorescent tones and shadings are produced by application of varying thicknesses and colors of non-fluorescent paints over the fluorescent sheetings, thereby reducing to the desired degree the fluorescence brightness of the section so treated.

It should now be clear that many sheeted materials other than fabrics, papers, and metals are operative as backing and supporting materials for visible-light-responsive fluorescent materials and coatings in the practice of this invention. To illustrate, cardboard stocks and thin sheets of natural and pressed woods, rubbers, and plastics may be employed successfully as backing material; visible-light-responsive fluorescent coating compositions may be applied to clean metal or like non-absorbent surfaces and, after drying, stripped off in the form of useful visible-light-responsive fluorescent sheetings. Also, visible-light-responsive fluorescent compositions in a liquid or plastic form may be extruded, pressed, or molded through use of superatmospheric temperatures and/or pressures to provide sheeted visible-light-responsive fluorescent media admirably suited for use in the fluorescent ornamentation of outdoor surfaces; sheeting so manufactured without a backing material often requires a coating of a light-reflective paint or other medium on the reverse side to efficiently reflect the visible light generated in the fluorescent composition during excitation. It is to be understood that the term "web" as used in the claims herein is used as a generic term for all of the aforesaid backing and supporting materials.

It is to be understood, therefore, that this invention is not limited to the embodiments and examples disclosed, but by the appended claims.

What is claimed is:

1. A device for conveying intelligence visually in daylight beyond the range of subtractive color perceptibility comprising a backing sheet and a fluorescent dye in a visible-light-responsive fluorescent state on said backing sheet imparting to said backing sheet a daylight fluorescent color comprised of a predominantly reflected waveband of incident visible light and florescent emitted light of substantially the same wave length as said predominantly reflected waveband.

2. A device for conveying intelligence visually in daylight beyond the range of subtractive color perceptibility comprising a sheet of metal having a white coating and a fluorescent dye in a visible-light-responsive fluorescent state on said coated metal imparting to said coated metal a daylight fluorescent color comprised of a predominantly reflected wave-band of incident visible light and fluorescent emitted light of substantially the same wave length as said predominantly reflected wave-band.

3. A device for conveying intelligence visually in daylight beyond the range of subtractive color perceptibility comprising white paper and a fluorescent dye in a visible-light-responsive fluorescent state on said white paper imparting to said white paper a daylight fluorescent color comprised of a predominantly reflected wave-band of incident visible light and fluorescent emitted light of substantially the same wave length as said predominantly reflected wave-band.

4. A device for conveying intelligence visually in daylight beyond the range of subtractive color perceptibility comprising a sheet of fabric and a fluorescent dye in a visible-light-responsive fluorescent state on said fabric imparting to said fabric a daylight fluorescent color comprised of a predominantly reflected wave-band of incident visible light and fluorescent emitted light of substantially the same wave length as said predominantly reflected wave-band.

5. A visual daytime signaling and display device for conveying intelligence beyond the range of subtractive color perceptibility comprising a sheet of fabric, a fluorescent dye affixed to said fabric in a visible-light-responsive fluorescent state, a transparent coating on said fabric, and a white coating on the side of said fabric opposite said transparent coating.

ROBERT C. SWITZER.

REFERENCES CITED

The following references are of record in the file of this patent:

UNITED STATES PATENTS

| Number | Name | Date |
|---|---|---|
| 1,977,329 | Tobin | Oct. 16, 1934 |
| 2,037,793 | Jacobson | Apr. 21, 1936 |
| 2,039,734 | Meder et al. | May 5, 1936 |
| 2,062,179 | Hunter | Nov. 24, 1936 |
| 2,215,196 | Schlack | Sept. 17, 1940 |
| 2,310,740 | Leavy | Feb. 9, 1943 |
| 2,341,009 | Axelrad | Feb. 8, 1944 |
| 2,275,290 | Dreyer | Mar. 3, 1942 |

FOREIGN PATENTS

| Number | Country | Date |
|---|---|---|
| 3,473 | British | Feb. 10, 1914 |
| 487,510 | British | June 22, 1938 |
| 579,896 | French | Aug. 16, 1924 |

OTHER REFERENCES

Commissioner's Order 3,741, 553 O. G., page 383.

De Ment, "Fluorochemistry," Chemical Publishing Company, Inc., New York 1945. (Copy in Division 3.)